United States Patent Office 3,794,567
Patented Feb. 26, 1974

3,794,567
STABILIZATION OF UNSATURATED ACIDS BY DISTILLATION WITH A COMBINED POLYMERIZATION INHIBITOR
Susumu Otsuki, Kyoichi Hori, and Isao Miyanohara, Shin Nanyo, Japan, assignors to Rohm and Haas Company, Philadelphia, Pa.
No Drawing. Filed Jan. 6, 1972, Ser. No. 215,902
Int. Cl. C07c 57/04; B01d 3/00
U.S. Cl. 203—8                                    6 Claims

ABSTRACT OF THE DISCLOSURE

A process is provided for inhibiting polymerization of a polymerizable unsaturated acid such as acrylic acid, and a process for stabilizing distillation of a polymerizable unsaturated acid such as acrylic acid, using a combination of polymerization inhibitors, i.e., benzoquinone and hydroquinone monomethyl ether and preferably with air (or oxygen) present in specified amounts. The process is also useful with other acids such as methacrylic acid.

DESCRIPTION OF PRIOR ART

Distillation operations are widely employed in processes for preparing a polymerizable unsaturated acid including acrylic acid and methacrylic acid and are particularly employed for concentration and purification of such acids. It is widely known that such acids are easily polymerized by being heated. Heat is necessary in such distillations and a means for inhibiting polymerization is essential.

In the case of using a generally known material as a polymerization inhibitor, e.g., hydroquinone, phenothiazine, catechol, methylene blue or the like, polymerization commonly occurs in the vapor phase, mainly on the column wall, on the reverse sides of plates, or on the overflow pipes. In the liquid phase in the column there is no such problem, since such known inhibitors are effective.

This polymer forms quickly and is substantially insoluble in almost all solvents, and blockage of a column may occur in a short time, and thereby necessitate intermittent rather than a continuous operation.

In other words, it can be said that successful distillation of acrylic acid or methacrylic acid depends upon the efficiency of the polymerization inhibition in the vapor phase.

Heretofore polymerization inhibitors for unsaturated acids at low temperatures or in the liquid phase is well known. However, such polymerization depends greatly upon temperature, and if the temperature exceeds a range of 60 to 70° C., polymerization velocity is increased exponentially in respect to the temperature. Usually, the distillation is carried out under a reduced pressure to permit lower temperatures, but a pressure drop is caused in the rectification trays, and a certain minimum temperature cannot be avoided at lower parts of the column. Furthermore, temperatures at the top end of the column are limited in many cases due to the freezing point of the distilled material, so that distillation at low temperatures is at times impractical.

In the case of using a conventional polymerization inhibitor to inhibit polymerization in the vapor phase of the distillation column, the large amounts necessary are not practical.

DESCRIPTION OF THE INVENTION

The inventors have found a way to improve polymerization inhibition, particularly in the vapor phase, at a high temperature in the separation of acrylic acid from impurities such as acetic acid. The process is also applicable to the separation of methacrylic acid from impurities such as propionic acid. Specifically, the present invention relates to a process which comprises feeding benzoquinone and hydroquinone monomethyl ether and preferably air (or oxygen) to the column or distillation zone and thereby permitting continuous distillation. Thus, benzoquinone and hydroquinone monomethyl ether are fed into a distillation column from the top and simultaneously air (or oxygen) (when used) is bled into the column from the bottom. The feed rate of the polymerization inhibitors is determined by the operating temperature.

The said feed rate of the total concentration of benzoquinone and hydroquinone monomethyl ether is preferably selected in the range of 50 to 5,000 p.p.m., in proportion to the weight of liquid in the column, although more can be used, and the concentration of air (or oxygen), when used, is selected in the range of 0.02 percent to 10 percent, preferably 0.1 percent to 2 percent, in proportion to the volume of vapor in the column. The ratio of benzoquinone to the monomethyl ether of hydroquinone is suitably from 0.1:20 to 20:0.1, preferably from 1:10 to 10:1, on a weight basis.

The following examples illustrate the present invention, but are not intended to limit the invention thereto.

Example 1

10 g. of purified acrylic acid and the specified polymerization inhibitor were added to a test tube which was immersed in an oil bath at 105° C., and the time of polymerization inhibition was measured.
The results are shown in Table I.

TABLE I

| Polymerization inhibitor | Concentration of the inhibitor (wt. percent) | Time before polymer deposition (hours) |
|---|---|---|
| No addition | | 1. |
| Hydroquinone | 0.03 | 30 or more. |
| Phenothiazine | 0.03 | 30 or more. |
| Benzoquinone | 0.03 | 5. |
| Hydroquinone monomethyl ether | 0.03 | 30 or more. |

Example 2

100 g. of purified acrylic acid and the named polymerization inhibitor were added to a flask having a condenser set for total reflux. The said flask was immersed in an oil bath at 105° C. and the material was refluxed under a pressure of 170 mm. Hg.
These tests were repeated several times and the average values of these tests results are set forth in Table II.

TABLE II

| Polymerization inhibitor | Concentration of the inhibitor (wt. percent) | Time before polymer deposition (hours) |
|---|---|---|
| No addition | | 0.5 |
| Hydroquinone | 0.3 | 0.7 |
| Phenothiazine | 0.3 | 1.5 |
| Benzoquinone | 0.3 | 1.0 |
| Hydroquinone monomethyl ether | 0.3 | 0.7 |

In all cases, polymerization occurred in the vapor phase and if these figures are compared with the results in Example 1, it will be noted that polymerization occurs in a very short time in spite of the high concentration of polymerization inhibitor in the liquid.

Example 3

In compliance with the procedure of Example 2, tests were conducted after oxygen gas in the amount of one volume percent in proportion to the amount of vapor was introduced. Otherwise, the tests were carried out in conformity to the conditions in Example 2.
The results are set forth in Table III.

TABLE III

| | Polymerization inhibitor | Concentration of polymerization inhibitor (wt. percent) | Time before polymer deposition (hours) |
|---|---|---|---|
| Process of Example 2. | No addition | | 1.5 |
| | Hydroquinone | 0.3 | 2 |
| | Phenothiazine | 0.3 | 1.5 |
| | Hydroquinone monomethyl ether | 0.3 | 4 |
| | Benzoquinone | 0.3 | 4 |
| The present invention. | Hydroquinone monomethyl ether | 0.15 | 6 |
| | +Benzoquinone | 0.15 | |

Comparing this table with Table II, it is clear that the effects of the polymerization inhibitors increase with the presence of oxygen and even better results are achieved by using the present invention.

Example 4

Purified acrylic acid was charged to a column of 50 mm. inside diameter equipped with fine perforated plates, and the acrylic acid was boiled with total reflux under an operating pressure of 160 to 170 mm. Hg, a bottom temperature of 120 to 130° C., and a vapor temperature of 95° C. to 100° C. The named polymerization inhibitor was added to the top of the said column in the form of an acrylic acid solution and air or oxygen was introduced into the column from the bottom thereof. The effect of the polymerization inhibitors is set out in Table IV.

Example 5

Similar results are obtained in accordance with the invention, but in the absence of air or oxygen.

What is claimed is:

1. A process for distillation of acrylic acid or methacrylic acid which comprises the introduction into the upper part of the distillation zone hydroquinone monomethyl ether and benzoquinone and distilling said acid.

2. The process of claim 1 in which the ratio of benzoquinone to hydroquinone monomethyl ether on a weight basis is 0.1:20 to 20:0.1 and the total of the two in the distillation zone at a given time is at least about 50 parts per million of the liquid in said zone.

3. The process of claim 2 in which said ratio is from 1:10 to 10:1.

4. The process of claim 1 in which oxygen is bled into the distillation zone.

5. The process of claim 3 in which an oxygen-containing gas is bled into the distillation zone in an amount corresponding to 0.02 percent to 10 percent of the total volume of the vapor in the zone.

6. The process of claim 5 in which acrylic acid is distilled and the amount of oxygen-containing gas in the distillation zone is from about 0.1 percent to 2 percent of the total gas volume in the zone.

TABLE IV

| | Polymerization inhibitor | Concentration of— | | Time before Polymer deposition (hours) |
|---|---|---|---|---|
| | | Inhibitor (wt. percent)[1] | Air or oxygen (volume percent)[2] | |
| Process of example | No addition | | Oxygen 1 | 3. |
| | Hydroquinone | 0.3 | Oxygen 1 | 5. |
| | Hydroquinone monomethylether | 0.1 | Air 2.5 | 10. |
| | Benzoquinone | 0.1 | Oxygen 0.5 | 8. |
| The present invention | Hydroquinone monomethylether +Benzoquinone | 0.05 0.05 | Oxygen 0.5 | 25. |
| | Hydroquinone monomethyl ether +Benzoquinone | 0.05 0.05 | Air 4 | 30 or more. |

[1] In proportion to the total weight of all solutions in the column.
[2] In proportion to a total vapor volume.

References Cited

UNITED STATES PATENTS

| | | | |
|---|---|---|---|
| 3,674,651 | 7/1972 | Otsuki et al. | 203—8 |
| 3,666,794 | 5/1972 | Otsuki et al. | 203—8 |
| 3,433,831 | 3/1969 | Yomiyama et al. | 203—8 |
| 3,527,677 | 9/1970 | Harpring | 203—8 |
| 3,239,433 | 3/1966 | Costolow | 203—8 |
| 2,399,340 | 4/1946 | Franz | 203—8 |

WILBUR L. BASCOMB, JR., Primary Examiner

U.S. Cl. X.R.

260—526 N; 203—49, 58, 51